Figures 1, 2:
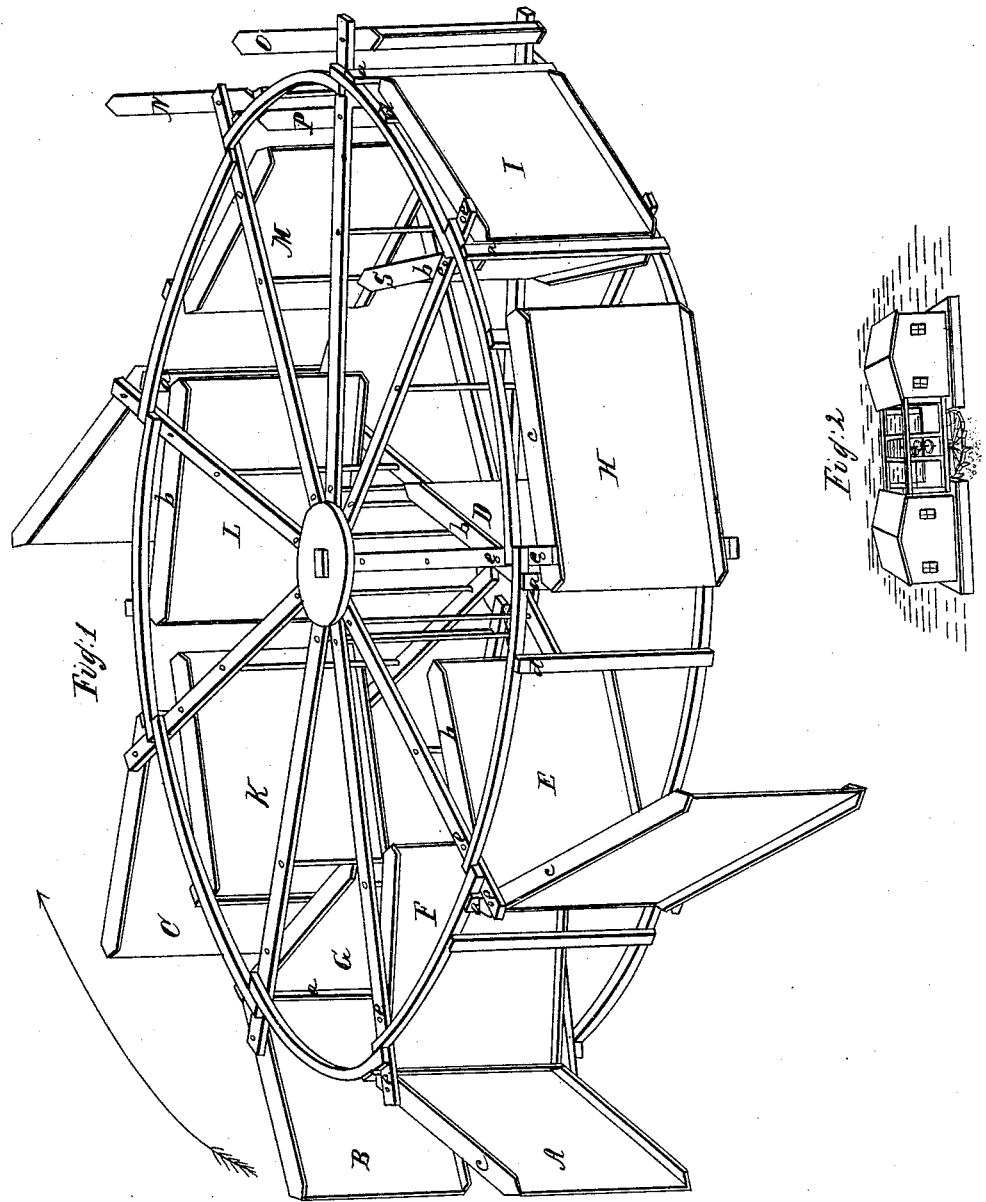

W. Lightfoot.
Tide Water Wheel.
N° 101,282.  Patented Mar. 29, 1870.

Witnesses  Inventor
F. G. Hampton  Wm Lightfoot
Lemuel M. "Bee

United States Patent Office.

WILLIAM LIGHTFOOT, OF HAMILTON COUNTY, TENNESSEE, ADMINISTRATOR OF JOHN S. LIGHTFOOT, DECEASED.

Letters Patent No. 101,282, dated March 29, 1870.

IMPROVEMENT IN CURRENT WATER-WHEELS.

The Schedule referred to in these Letters Patent and making part of the same.

*To all whom it may concern:*

Be it known that JOHN S. LIGHTFOOT, who was a citizen of Hamilton county, Tennessee, now dead, invented a new and useful Water-Wheel, designed to utilize the power of water currents in rivers and other bodies of flowing water; and I, WILLIAM LIGHTFOOT, his heir and legal representative, having the right, by act of Congress, of applying for and obtaining a patent for said invention, do hereby declare that the following is a full, clear, and exact description of the construction and operation of the same, reference being had to the annexed drawing making a part of the description, in which—

Figure 1 is a perspective view of the wheel, showing the wheel in its horizontal position in the water, and the construction and arrangement of the buckets $c\ c\ c\ b\ b\ b$, and their position when the wheel is made by the current to revolve in the direction indicated by the arrow.

These buckets turn upon axles $e\ e\ e$, through angles of about eighty degrees.

When thrown open by the force of the current, as at A, B, C, D, E, F, and G, they abut against the strips $a\ a\ a$; but when closed by the current, the exterior buckets H I and interior buckets K L M abut against strips $d\ d\ d$.

Buckets N O P S will be parallel to the current, and consequently swing freely.

Figure 2 shows the application of this wheel to a grist or other mill.

The wheel works upon a vertical shaft between two securely anchored boats, which are connected by a strong and rigid frame of timber or iron, and by means of suitable gearing drives machinery within the boats.

What I claim is—

The buckets, opening and closing in pairs inwardly and outwardly, so that the action of the current upon them is obtained in causing the wheel to revolve when submerged horizontally in the water, all substantially as shown and described.

WM. LIGHTFOOT.

Witnesses:
F. T. HAMPTON,
SAMUEL McBEE.